United States Patent
Ogawa (10) Patent No.: US 6,352,602 B1
(45) Date of Patent: Mar. 5, 2002

(54) BEAD WIRE WINDING DEVICE AND WINDING METHOD

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/424,535

(22) PCT Filed: Apr. 6, 1999

(86) PCT No.: PCT/JP99/01824

§ 371 Date: Mar. 31, 2000

§ 102(e) Date: Mar. 31, 2000

(87) PCT Pub. No.: WO99/51424

PCT Pub. Date: Oct. 14, 1999

(30) Foreign Application Priority Data

Apr. 7, 1998 (JP) ............................................ 10-094795
Feb. 23, 1999 (JP) ............................................ 11-044402

(51) Int. Cl.[7] .............................................. B29D 30/48
(52) U.S. Cl. .................... 156/131; 156/130.7; 156/136; 156/398; 156/422
(58) Field of Search ................................ 156/136, 422, 156/117, 131, 130.7, 135, 397, 398, 403; 245/1.5

(56) References Cited

U.S. PATENT DOCUMENTS 1,423,929 A * 7/1922 Fording ...................... 156/136
1,914,040 A * 6/1933 Pierce ......................... 156/131
3,057,566 A * 10/1962 Braden ........................ 156/422

FOREIGN PATENT DOCUMENTS

| JP | 56-105948 A | * | 8/1981 | ................. 156/422 |
| JP | A-2-62232 | | 3/1990 | |
| JP | A-6-198766 | | 7/1994 | |
| JP | A-6-286021 | | 10/1994 | |

* cited by examiner

*Primary Examiner*—Geoffrey L. Knable
(74) *Attorney, Agent, or Firm*—Oliff & Berridge, PLC (57) ABSTRACT

A bead wire winding device is provided with a winding guide(s) (3) which is rotated with a molding support body (1), and which approachingly and retreatingly displaces with respect to each side portion of the molding support body (1). A bead wire (W) is supplied to a wire seating portion (11) of the winding guide (3) within a space defined by each winding guide (3) which is in an approached state with respect to a respective side surface of the molding support body (1), and in an enlarged diameter state. The winding guide (3) is constituted by a plurality of radially displacing members (9), which can be enlargingly and reducingly displaced in a radial direction, connected to a boss portion (7) through link members (8). Each of the radially displacing members (9) has a protrusion that forms a wire seating portion (11). A clamping claw (13) is provided on at least one of the radially displacing members (9), and is urged constantly in a closing direction and pinches a tip portion of the bead wire (W).

10 Claims, 11 Drawing Sheets

FIG_5

FIG_6a

FIG_6b

FIG_10

FIG_11a

FIG_11b

BEAD WIRE WINDING DEVICE AND WINDING METHOD

TECHNICAL FIELD

This invention relates to a bead wire winding device which can be suitably applied in order to directly wind and dispose a bead wire at a predetermined position of a tire during molding on a rotatable molding support body.

BACKGROUND ART

When a tire is molded on a molding support body, for example a cylindrical drum or a core body with an external ring shape corresponding to an internal surface shape of a product tire, a bead wire is arranged at a predetermined position of a tire side portion during molding. This positioning is normally performed by attaching a bead ring, which is wound and formed in advance in a ring shape of a predetermined dimension by a bead fabricating device, to a side portion of a tire by a manual operation of an operator or by using a device called a bead setter.

Therefore, according to the prior art, until various types of bead rings which are fabricated in advance are used, space is needed to sort and store them or the like, and a number of operational processes are needed. Needless to say, when a bead ring is arranged by a manual operation, it is difficult to reliably realize highly accurate arrangement. Meanwhile, when a bead ring is arranged by using a bead setter, arrangement accuracy can be improved. On the other hand, it is necessary to provide a bead setter in addition to a bead fabricating device, so equipment cost becomes high, and there is a problem such that the number of operations to mount a bead ring onto the bead setter becomes high. Furthermore, when a plurality of bead rings are arranged in each side portion of tire by a conventional bead setter, a number of operations are needed to hold each bead ring onto the bead setter. In addition, there is a high possibility that plastic deformation will be generated in a bead ring while the bead ring is handled, and there is a problem such that deterioration of tire quality cannot be avoided.

Figure 10:
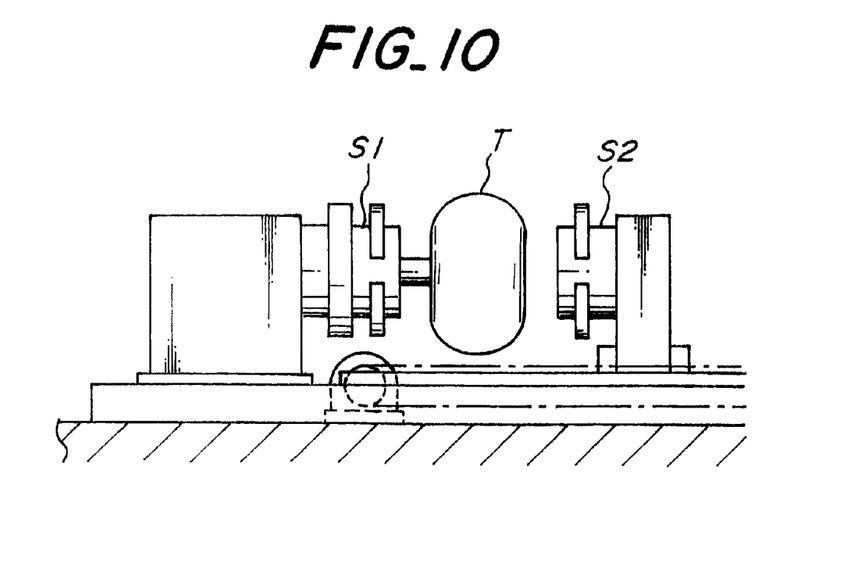
FIG. 10 is a perspective view showing a conventional bead setter.

That is, a conventional bead setter, shown in a perspective view of FIG. 10, sets a plurality of bead rings in each side portion of a tire during molding. This conventional bead setter sets two circular bead rings or more, which have the same diameter and are formed of steel cords, in advance at predetermined positions of each side portion during molding of a heavy load-use tire used for a truck, bus, or the like. Prior to setting, each bead ring is engaged and held by a manual operation of an operator at the tip of cylinder setters S1 and S2, respectively, which approach and withdraw from respective side portions of a tire T in a horizontal direction during molding. Because of this, when two bead rings or more are respectively set at each side portion of a tire during molding, there is a problem such that the number of operation processes become high because the operation of securing a bead ring in each cylinder setter S1 and S2 has to be performed at least twice.

Figure 11A:
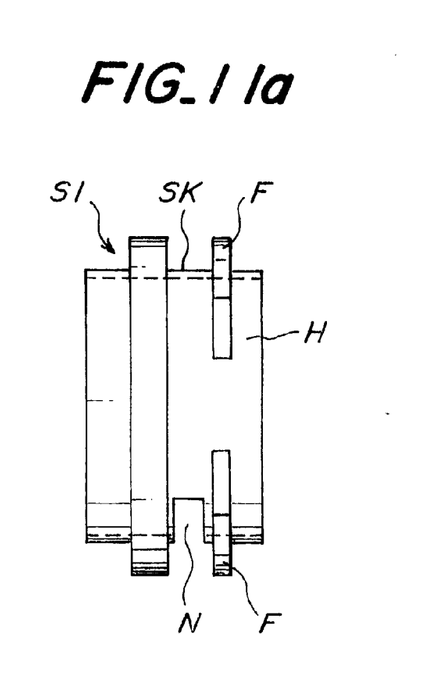
FIGS. 11a and 11b are explanatory diagrams showing a cylindrical setter.
Figure 11B:
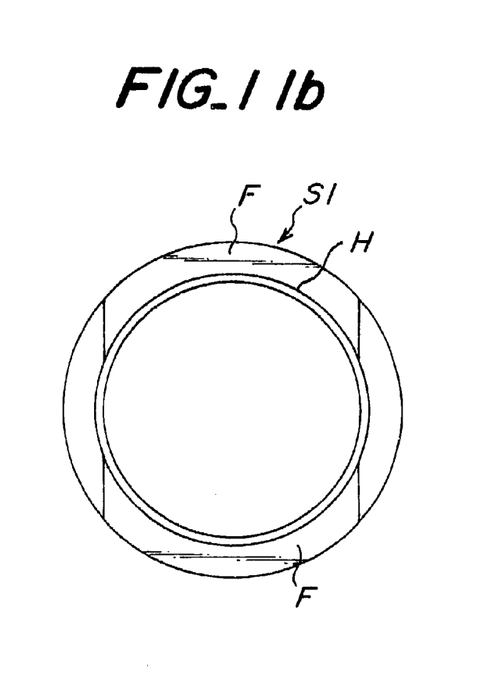

Incidentally, when a bead ring is thus set, an external diameter of the tire T becomes larger than an internal diameter of the bead ring from the beginning of the molding or during the molding. Therefore, particularly, prior to molding a tire, it is necessary to hold or support a predetermined number of bead rings, for example two bead rings, in advance on the cylinder setter S1 which is arranged in a rotary driving portion of the tire T. Because of this, in a conventional cylinder setter S1, as shown in an enlarged perspective view and a plan view of FIGS. 11a and 11b, respectively, a tip holding portion H which has an external diameter substantially equal to an internal diameter of a bead ring is provided to engage the first bead ring that is initially set at a side portion of the tire T. At the same time, a space SK is provided to temporarily store a second bead ring which is set next. This space SK is positioned behind two diametrically opposed flanges F, at upper and lower positions in the figure.

Figure 12A:
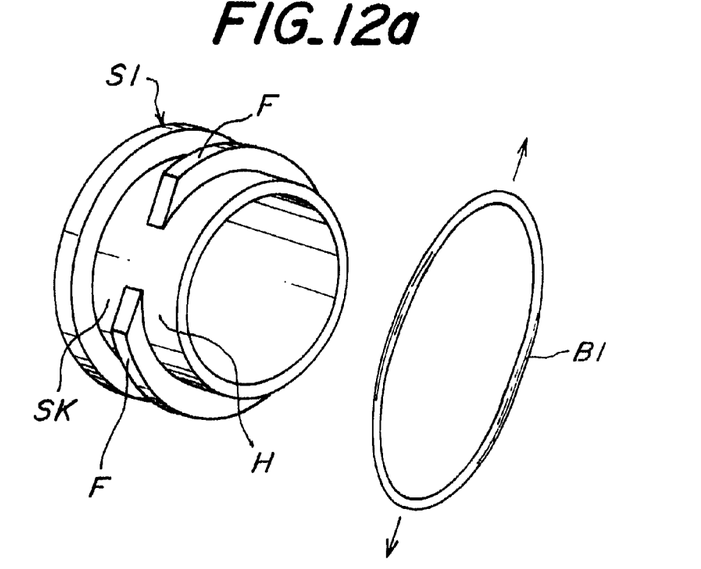
FIGS. 12a, 12b, 12c, and 12d are explanatory diagrams showing an operation of a cylindrical setter.
Figure 12B:
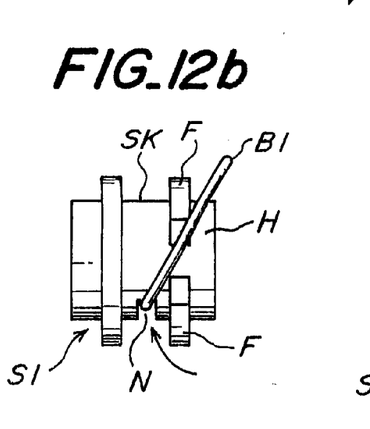
Figure 12C:
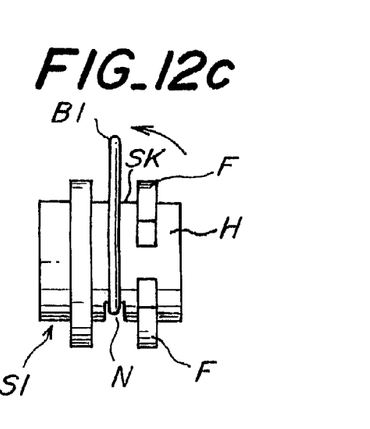
Figure 12D:
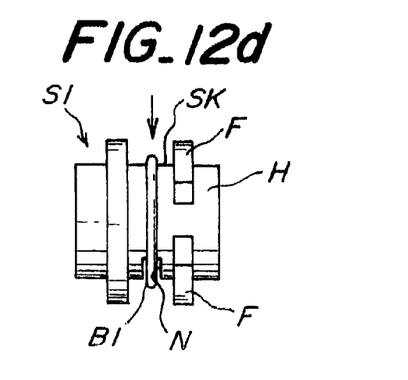

Here, arrangement of the second bead ring to the space SK is shown in FIG. 12a. A bead ring B1 is elastically deformed in a substantially longitudinally elliptical shape. First, the lower end portion is passed around the lower side of the lower end side of the flange F and engaged in a notch N disposed under the space SK, as shown in FIG. 12b. Subsequently, the upper end portion of the bead ring B1 is made to pass over and behind the top end side of the flange F, as shown in FIG. 12c. Then, an external force which operates the bead ring B1 is removed, and the bead ring elastically recovers into a ring shape and is supported by a tube shape portion of the space SK. Furthermore, arrangement of the first bead ring to the tip holding portion H is performed as the bead ring is maintained in a ring shape as-is and engaged by the circumference of the tip holding portion H.

Therefore, as the first bead ring which is initially set in a side portion of the tire T is set while maintaining its initial ring shape, there will be no particular problem. However, there is a high possibility that undesired plastic deformation will occur in the second bead ring B1 each time it is arranged in the space SK as described above, and each time it is removed from the space SK, due to the deliberate deformation into a substantially elliptical shape. There was a serious problem such that it was substantially impossible to accurately set the bead ring B1 at a predetermined position, due to this plastic deformation.

DISCLOSURE OF THE INVENTION

This invention was made to solve the above-mentioned problems in the prior art. An object of this invention is to provide a bead wire winding device which can accurately arrange a bead wire at a predetermined position with few operations without increasing equipment cost and causing undesired plastic deformation to a bead wire. Another object is to eliminate the need to pre-manufacture and store various types of bead rings in which a bead wire is wound and formed in a ring shape, and to completely eliminate the need for space and numerous operations to sort or store the bead wires.

A bead wire winding device of this invention is provided with a molding support body connected to a rotational shaft, a winding guide(s) which is rotated with the molding support body, and which approachingly and retreatingly displaces with respect to each side portion of the molding support body and enlargingly and reducingly deforms, and a wire supply means which supplies a bead wire to a wire seating portion of the winding guide within a space defined by each winding guide which is in an approached state with respect to a respective side surface of the molding support body, and in an enlarged diameter state. The winding guide is constituted by a plurality of radially displacing members, which can be displaced in a radial direction, connected to a boss portion through link members. Each of the radially displacing members has a protrusion that is located radially inward an outer periphery of the respective radially displacing member and which forms a wire seating portion. Furthermore, an advance/retreat driving means of a boss portion is disposed that advancingly and retreatingly drives the boss portion with respect to the molding support body. A clamping claw is provided on at least one of the radially displacing members, and is urged constantly in a closing direction and pinching a tip portion of the bead wire. A driving means is disposed which causes opening displacement of the clamping claw.

According to the above-mentioned structure of a bead wire winding device of this invention, regardless of whether the molding support body is a conventionally known flat molding drum or a core body with an external ring shape corresponding to an internal surface shape of a tire, a winding guide is made to approach and be positioned at a side portion of the molding support body. By winding a bead wire in an enlarged-diameter state on a side surface of a molding support body, that is, within a space bounded by a winding guide and a tire side surface during molding, it is possible to directly and accurately dispose a bead wire at a predetermined position at each side portion of a tire during molding when a molding operation of the tire is performed.

Therefore, according to this invention, it is possible to sufficiently prevent problems related to numerous operations, occupied space, equipment cost, bead rings, that is, deformation of bead wires, and the like that arise in pre-fabricating ring-shaped bead rings.

Furthermore, in the above-mentioned device, a radially displacing member can be constituted by a fan-shaped member or a circular arc-shaped segment, or a rod member, in which a peripheral width is far narrower.

Preferably, an advance/retreat driving means of a boss portion and a driving means of a clamping claw are fixed to respective non-rotational side members. In this case, the weight of rotation members which are rotated and driven with the molding support body can be advantageously decreased, and a power supply structure to the driving means can be simply performed.

Preferably, the molding support body can be removed from a rotational axis, and, for example, the molding support body can be separated from the rotational axis while remaining integral with a green tire formed thereon. In this case, the molding support body can function as-is as an internal surface type within a vulcanizing mold, and a process of separating the green tire from the molding support body is not needed.

Preferably, the wire supply means is constituted by a reforming roll which bends and deforms a bead wire which has been fed out, a grooved roll which specifies a winding position of the bead wire after it goes through the reforming roll, and a pressing roll which presses a trailing end portion of the bead wire after it goes through the grooved roll. In this case, between the grooved roll and the pressing roll, it is preferable that a cutter be disposed to cut a bead wire which has been wound over a predetermined length.

Preferably, the wire supply means can be displaced in an axial direction of the rotational axis during the operation. The displacement in the axial direction is a displacement with a pitch equivalent to a thickness of the bead wire.

Furthermore, the displacement of a radially displacing member of a winding guide in a radial direction, based upon the operation of a link member, can be performed as follows, for example. When a boss portion is moved toward a molding support body along the rotational axis, each radially displacing member is slid in a radially outward direction on an inclined cam surface disposed on the rotational axis. When the boss portion is moved in the reverse direction, each radially displacing member is slid in a radially inward direction on the inclined cam surface. However, more preferably, a base tube that rotates and a boss portion are sequentially arranged on the rotational axis, and the base tube and the boss portion can be mutually independently displaced in an axial direction of the rotational axis. A guide means which guides displacement of a radially displacing member in a radial direction, for example, a rail and a direct moving guide formed of a slider engaged with the rail, is provided on each radially displacing member, and on a flange disposed at the end portion of a molding support body side, of the base tube.

According to this, within a surface perpendicular to the rotation axis, displacement can be smoothly and accurately performed while maintaining the radial displacing member at a predetermined position. In addition, fixing of a cam member or the like on a rotational axis is not needed, and removing and fixing of a structural member of the device to a rotational shaft can be easily performed.

Additionally, this invention proposes a method of winding a bead wire which can be suitably obtained by using a winding device which is structured above. In a method of winding a bead wire of this invention, prior to arranging a bead wire which is made to rest against a side portion of a molding support body, that is, a tire molded on the molding support body, in a radial direction and a circumferential direction, the bead wire is wound a predetermined number of levels on a wire seating portion protruding toward the molding support body of the winding guide within a space defined by the molding support body and the winding guide which is in an approached state with respect to a respective side surface of the molding support body, and in an enlarged diameter state. After completion of winding the bead wire, the winding guide is made to be distant from the molding support body in a reduced diameter state and the bead wire is maintained at a required position of the molding support body.

According to this invention, by winding a bead wire when a molding operation of a tire is performed, it is possible to directly and accurately arrange a bead wire at a desired position without having an unexpected deformation, and efficiency of the operation of arranging a bead wire can be significantly improved.

BEST MODE FOR CARRYING OUT THE INVENTION

The following further explains embodiments of this invention with reference to the drawings.

Figure 1:
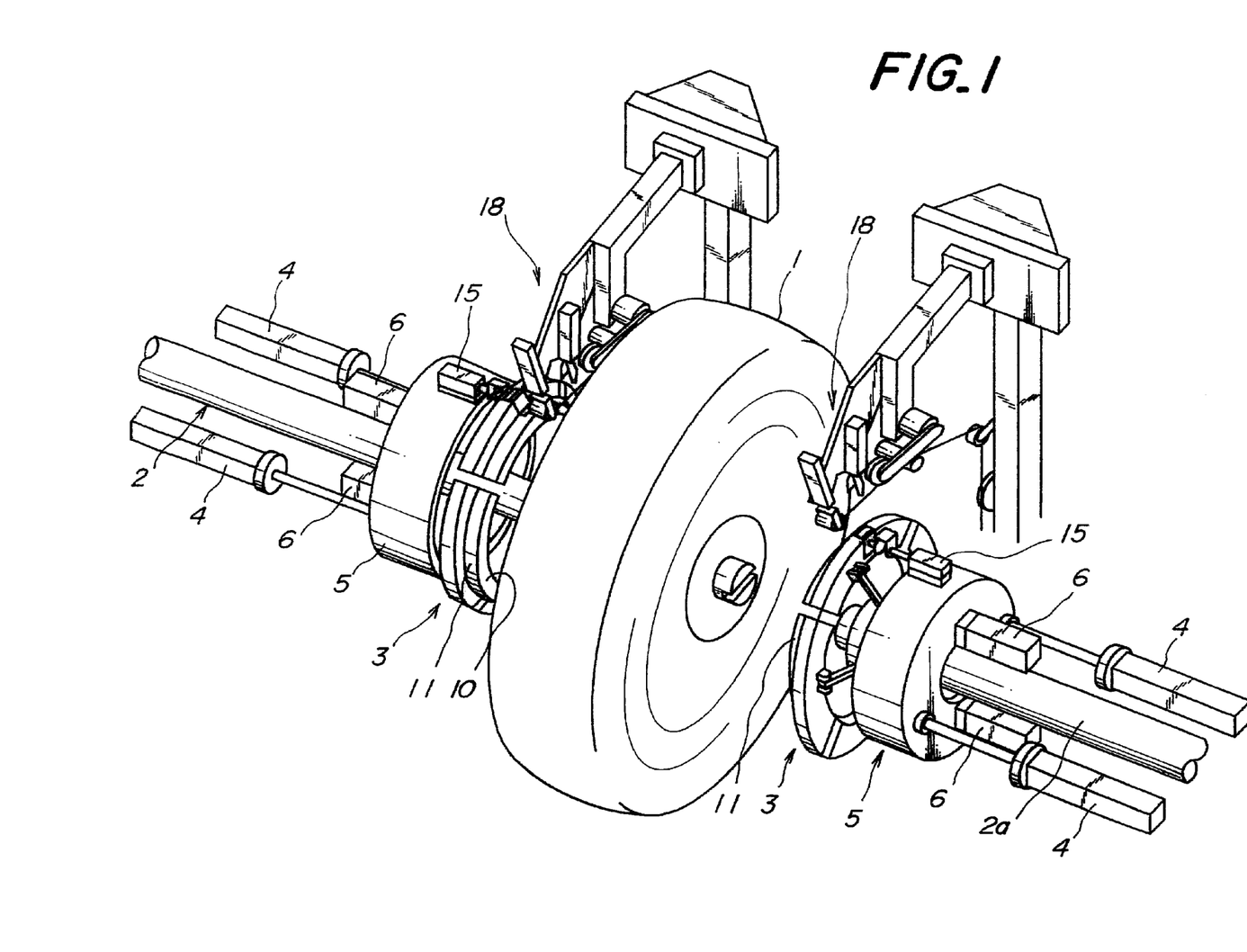
FIG. 1 is a perspective view showing one embodiment of a bead wire winding device according to this invention.

FIG. 1 is a perspective view showing one embodiment of a bead wire winding device according to this invention. 1 is a core body as one example of a molding support body, and this core body 1 has an external ring shape corresponding to an internal shape of a product tire.

The core body 1 is detachably drivingly coupled to a rotation shaft 2 which is rotated by a driving means, which is not depicted, arranged at the left side of the figure. Furthermore, at each side portion of the core body 1, a winding guide 3 is arranged which is rotated with the core body 1, and which approaches and retreats from the side portion of the core body 1, and which also enlargingly and reducingly deforms.

Here, rotational movement of the winding guide 3 can be realized as a boss portion of the winding guide 3 is coupled to the rotational shaft 2 by a key, a spline(s), a serration(s), or the like. However, for example, when the core body 1 is removed from the rotational shaft 2 by displacing the core body 1 in an axial line direction toward the right of the figure, it is necessary move the winding guide 3 positioned at the right side portion of the core body 1 in a rightward direction of the figure or a front or rear direction, along with an engaged axial portion 2a, where it does not interfere with the core body 1 or the like. Therefore, as shown in the figure, in an appropriate connecting state of the core body 1 to the rotational shaft 2, the axial portion 2a protruding from the core body 1 toward the right side of the figure is made to be horizontally displaced in an axial direction integrally with the winding guide 3, so the axial portion 2a can be detachable with respect to the main body portion of the rotational shaft 2. Meanwhile, peculiar male and female engaging portions, for example, are disposed at respective axial ends of the axial portion 2a and the rotational axis main body portion, and the axial portion 2a can be re-engaged by movement in a direction opposite to that in the foregoing explanation with respect to the winding guide 3.

Figure 2:
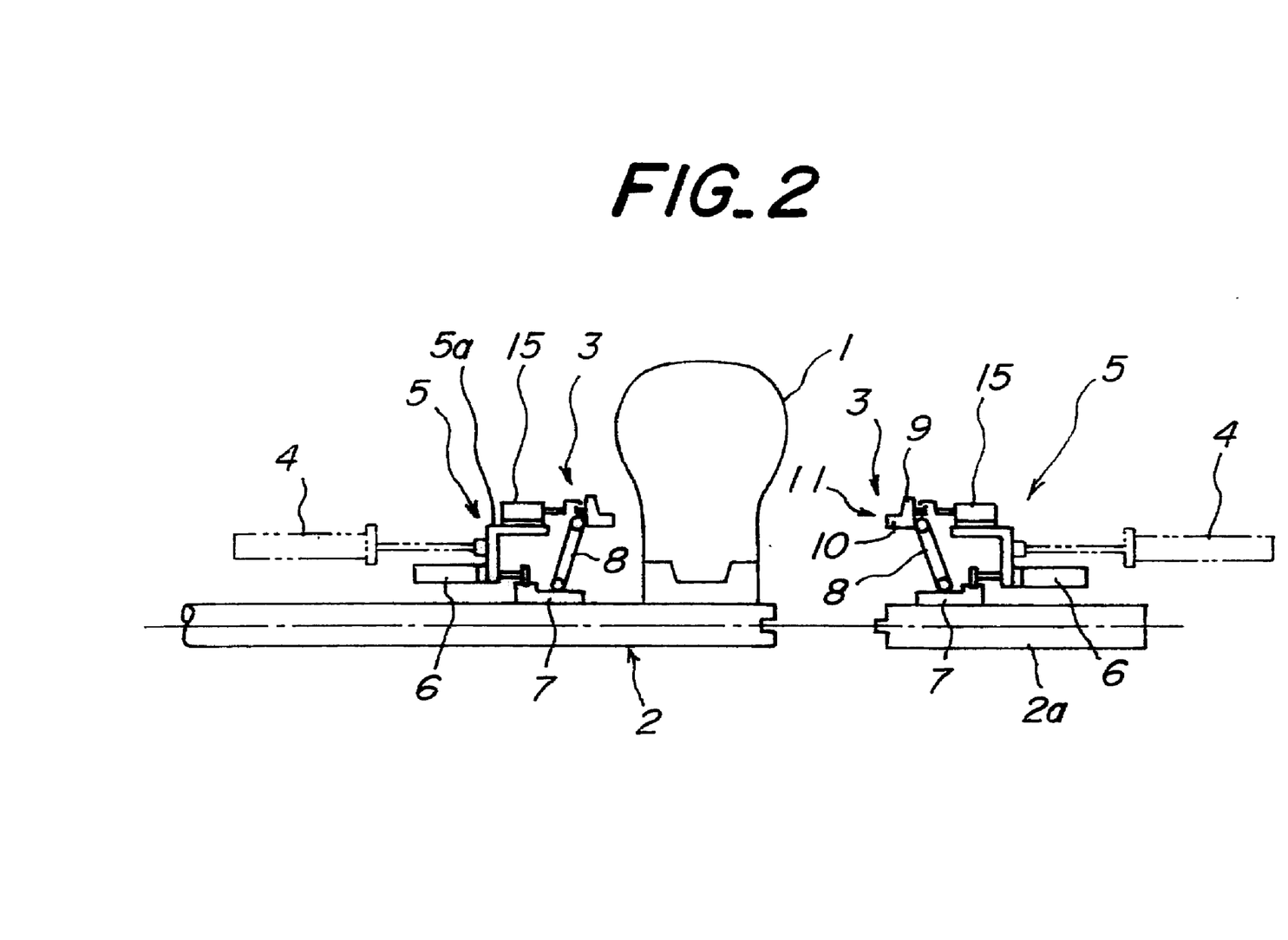
FIG. 2 is a cross-sectional view showing an upper half portion of an advance/retreat mechanism and an enlarging/reducing deformation mechanism of a winding guide.

Furthermore, for the approaching and separating displacement of the winding guide 3 with respect to the side portion of the core body 1, a pair of cylinders 4 which can be synchronously operated is attached at the fixed member side, preferably at diametrically opposed positions of the rotational shaft 2. A housing 5 of the winding guide 3, which is supported by the boss portion of the winding guide 3, surrounds the rotational shaft 2, with a space between the housing 5 and the rotational shaft 2, is advancingly and retreatingly displaced with respect to the core body 1 by the cylinders 4. FIG. 2 is a cross-sectional view showing an upper half portion of this mechanism, above the center axis line. The housing 5 is supported by the pair of cylinders 4, which are attached to the fixed member side. The rods of a pair of enlarging/reducing cylinders 6, preferably disposed at diametrically opposed positions, are connected to the boss portion 7 of the winding guide 3. Thus, the winding guide 3 can be approachingly and retreatingly displaced with respect to the core body 1 as needed by the operation of the cylinders 4.

Additionally, the rods of the enlarging/reducing cylinders 6 are connected to the boss portion 7, which is rotated with the core body 1, via a thrust bearing or a radial bearing. Thus, advancing/retreating driving of the boss portion 7 by the cylinders 6 is possible, and free rotation of the boss portion 7 with respect to the cylinder rods is possible. Meanwhile, the housing 5 connected to the fixed member side via the cylinders 4 is maintained in a non-rotational state.

Figure 3A:
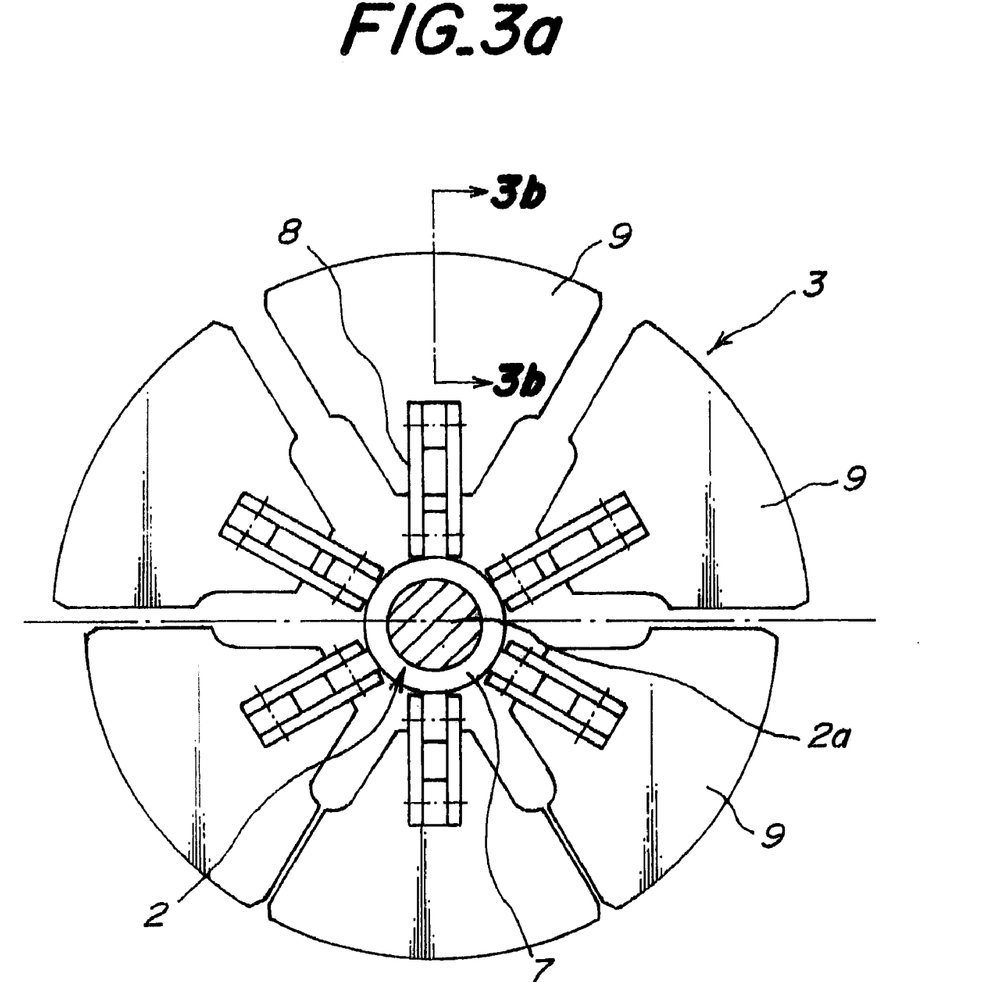
FIGS. 3a and 3b are a rear view and a partial cross-sectional view, respectively, of a winding guide.
Figure 3B:
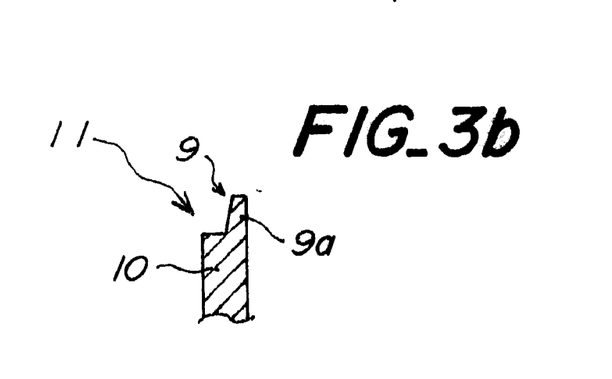

Incidentally, as shown in a rear view and a partial cross-sectional view in FIGS. 3a and 3b, respectively, the winding guide 3 shown in the figures is structured such that the tip portion of each of the plurality of link members 8 connected to the boss portion 7 are hinge-connected to a plurality of fan-shaped members 9, which are one example of a radial displacing member. Diameter enlarging displacement of the winding guide 3 can be performed, based upon advancing displacement of the boss portion 7 effected by the operation of the enlarging/reducing cylinders 6, via a radial direction guide means which allows movement only in reducing and enlarging directions with respect to the rotational shaft 2. The respective fan-shaped members 9, which are maintained in positions within a plane perpendicular to an axial line of the rotational shaft 2, are displaced in a radially outward direction through the link members 8. Furthermore, diameter reducing changes of the winding guide 3 can be performed by displacing each fan-shaped member 9 in a radially inward direction, based upon retreating displacement of the boss portion 7.

Furthermore, in FIG. 3b, as shown in a partial cross-sectional view along line 3b—3b of FIG. 3a, a protrusion 10 is provided on the side of each fan-shaped member 9 facing the core body 1. The protrusion 10 forms a wire seating portion that is positioned radial inward of the outer periphery of the fan-shaped member 9. The protrusion 10 forms a wire seating portion 11 along with like protrusions 10 of the other fan-shaped members 9 under the enlarging displacement of the fan-shaped members 9 shown in the upper half portion of FIG. 3a. Furthermore, in a state in which the winding guide 3 has approached the core body side portion, in cooperative interaction with the side surface of the core body 1 and flanges 9a of the fan-shaped members 9, which protrude radially outward from the protrusions 10, these wire seating portions 11 define a bead wire winding space with a predetermined cross-sectional shape.

Figure 4A:
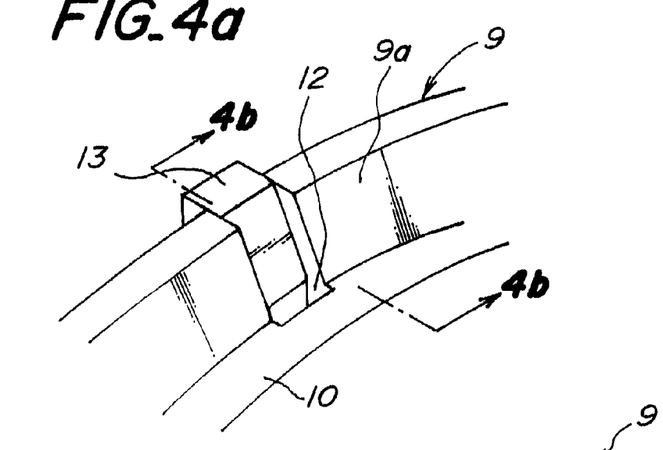
FIGS. 4a, 4b, and 4c are explanatory diagrams showing a mechanism that grips a tip portion of a bead wire.
Figure 4B:
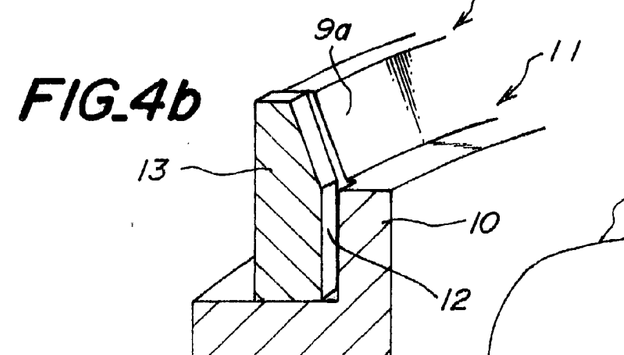

Furthermore, in order to hold a tip portion, that is, a winding start portion, of a bead wire in some position in the winding space, a notch 12 is disposed in a radial direction in the flange 9a of at least one fan-shaped member 9, as shown in FIGS. 4a and 4b, which extends to the rear surface side of the protrusion 10 from the outer periphery of the flange 9a. Additionally, a clamping claw 13 which is advancingly and retreatingly displaced in a thickness direction of the fan-shaped members 9 is disposed within the notch 12, and a bead wire tip portion which is inserted to the rear surface side of the protrusion 10 can be pinched and held as the clamping claw 13 advances.

Figure 4C:
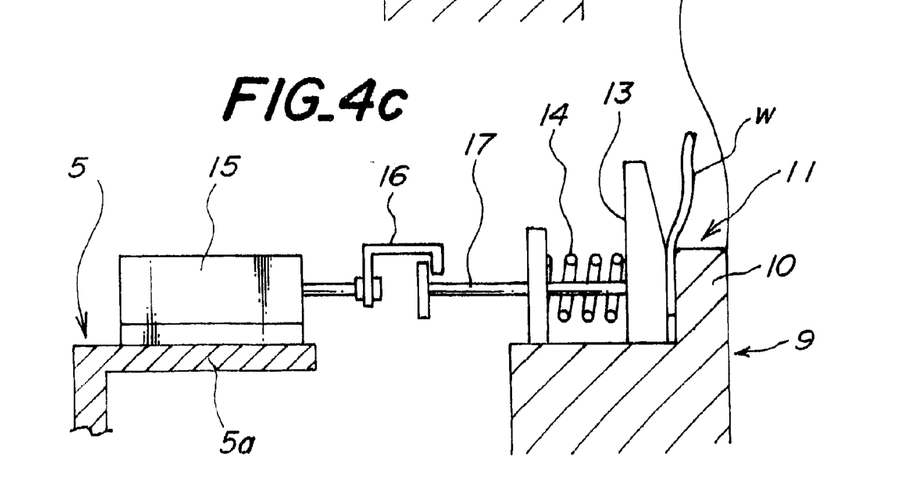

FIG. 4c is a cross-sectional view showing a state in which a tip portion a bead wire W is pinched and held. Here, as the clamping claw 13 is constantly urged in an advancing direction, that is, a closing direction, by an elastic means, for example, a compression spring 14, disposed at its rear surface side, the bead wire W is pinched with a predetermined strength between the clamping claw 13 and the rear surface of the protrusion 10.

Meanwhile, releasing the bead wire W, that is, opening of the clamping claw 13 after completion of predetermined winding of the bead wire W, can be performed as a rod 17 protruding to the rear surface side of the clamping claw 13 is retreatingly displaced against the spring force of the compression spring 14 by a cylinder 15 attached to a cylindrical portion 5a of the housing 5 as a fixed member, via a hook 16 disposed at the rod end. Additionally, because the cylinder 15 is fixed to the housing 5, which is a non-rotational side member, interference between the rod 17 which is rotated and moved along with the winding guide 3 and the rod end hook 16 can be prevented by placing the hook 16 in an advance-restricted position as shown in the figure during non-operation of the cylinder 15, when the hook structure is such as is shown in FIG. 4c.

Returning to FIG. 1, 18 shows a wire supply device that supplies a bead wire to the wire seating portion 11 within the bead wire winding space defined by the side surface of the core body 1 and the winding guide 3 which has approached the side surface of the core body 1 in an enlarged-diameter state.

Figure 5:
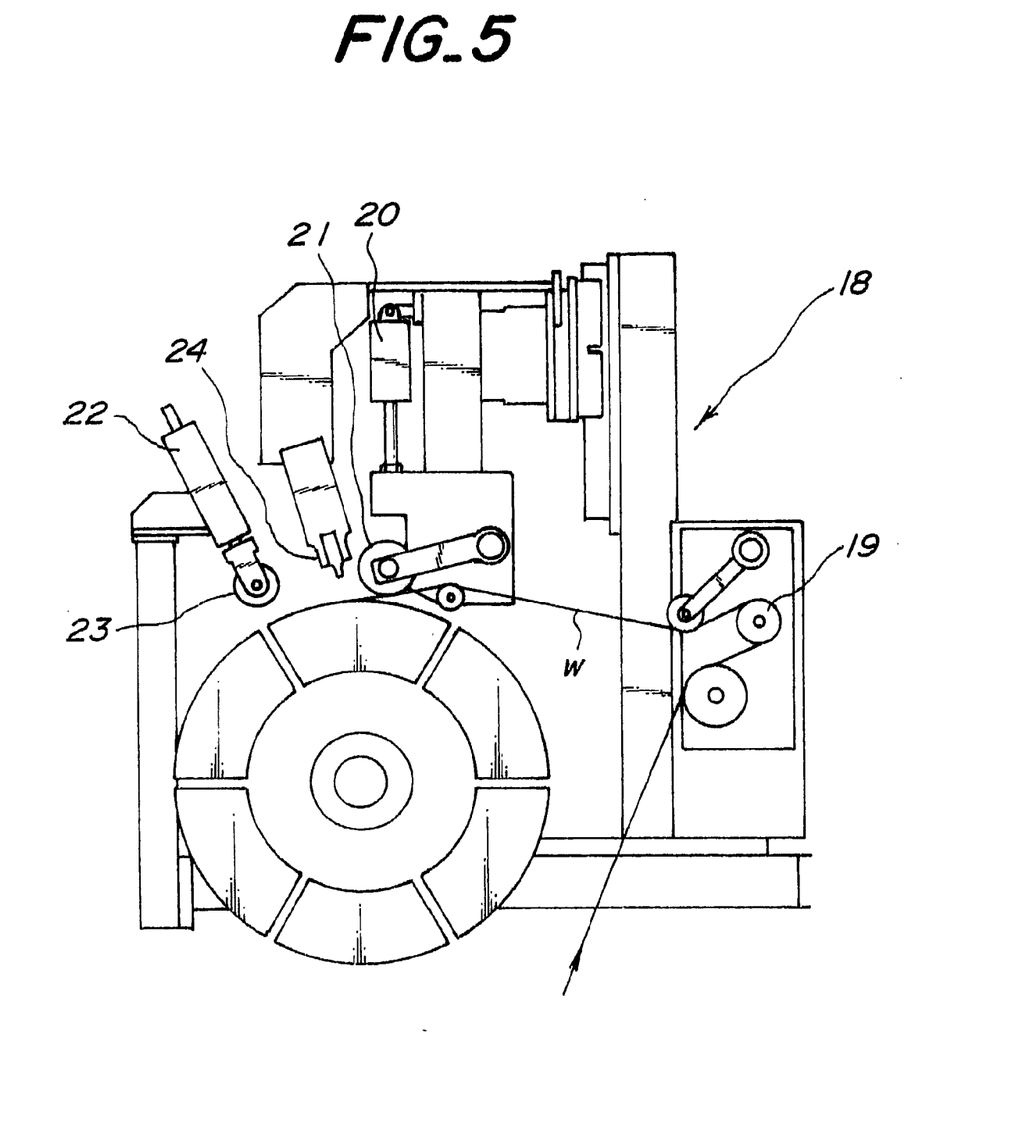
FIG. 5 is an enlarged perspective view showing a wire supply device.

As shown and clarified in an enlarged perspective view in FIG. 5, this wire supply device 18 includes a reforming roll 19, which causes predetermined bend and deformation of a bead wire W which is fed out, a grooved roll 21 that is displaced in an up-and-down direction in the figure by a cylinder 20, and specifies a winding position of the bead wire W which has passed through the reforming roll 19, a pressure roll 23 which is advancingly and retreatingly displaced in a radial direction of the winding guide 3 by a cylinder 22, and presses the trailing end portion of the bead wire W which has passed through the grooved roll 21, and a cutter 24 disposed between the pressure roll 23 and the grooved roll 21. The wire supply device 18 with this structure, or at least the portion of the wire supply device 18 frontward of the reforming roll 19, can be displaced in an axial line direction of the rotational shaft 2 by, for example, a pitch equivalent to a thickness of the bead wire W during operation.

Figure 6A:
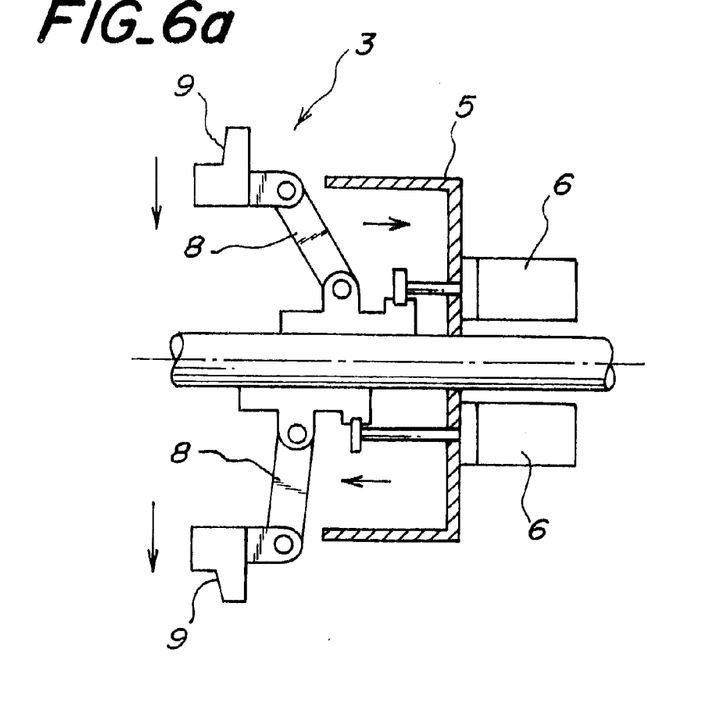
FIGS. 6a and 6b are explanatory diagrams showing an enlarging/reducing deformation state of a winding guide.
Figure 6B:
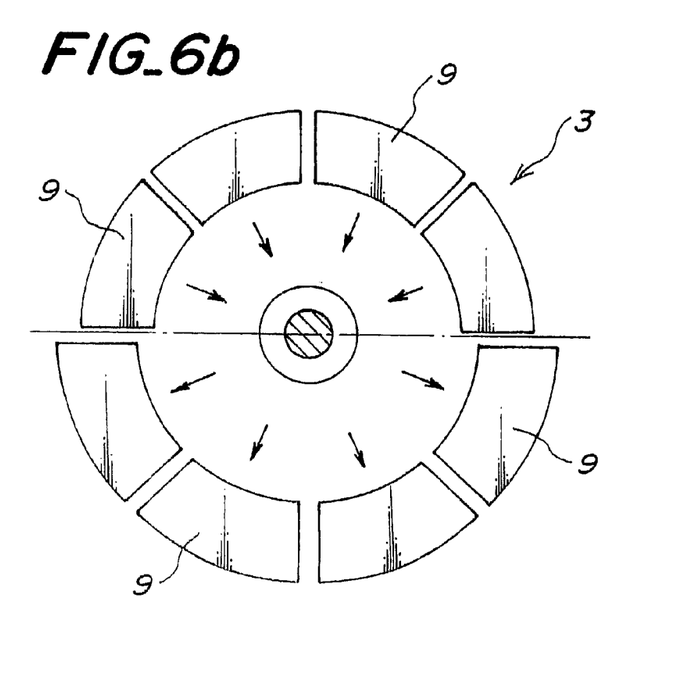

When winding of a bead wire is performed by a device which is thus structured, first, the cylinders 4 are operated, and the winding guide 3 approaches the side surface of the core body 1 along with the housing 5. At the same time, the enlarging/reducing cylinders 6 fixed to the housing 5 are operated, and the radially displacing members, that is, the winding guide 3, that is in the reduced diameter position shown in the upper half portion of FIG. 6a is placed in the enlarged diameter state shown in the lower half portion of FIG. 6a. FIG. 6b is a front view of the winding guide 3 showing this, and this shows the case when the radially displacing members of the winding guide 3 are circular arc segments.

A predetermined bead wire winding space is created between the winding guide 3 and the side surface of the core body 1 by this type of displacement and deformation of the winding guide 3.

Figure 7:
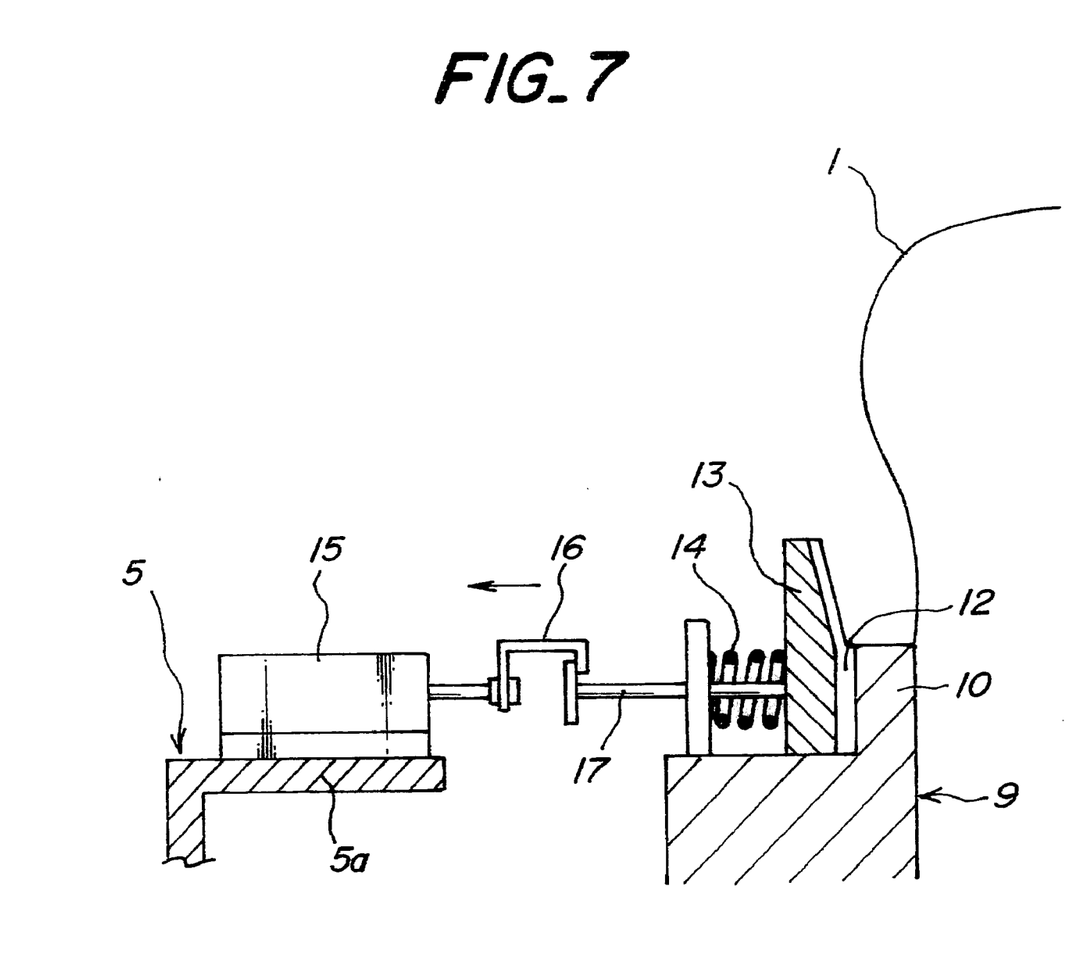
FIG. 7 is an explanatory diagram showing an open state of a clamping claw.

Additionally, by changing the winding guide 3 to an enlarged diameter state, the protruding rod 17 of the clamping claw 13, disposed on a specified circular arc segment, fan-shaped member 9 or the like, and the hook 16 fixed to the cylinder 15 on the housing 5 are placed in corresponding positions as shown in FIG. 4c, so by operating the cylinder 15, the clamping claw 13 is placed in the open state shown in FIG. 7.

Figure 8A:
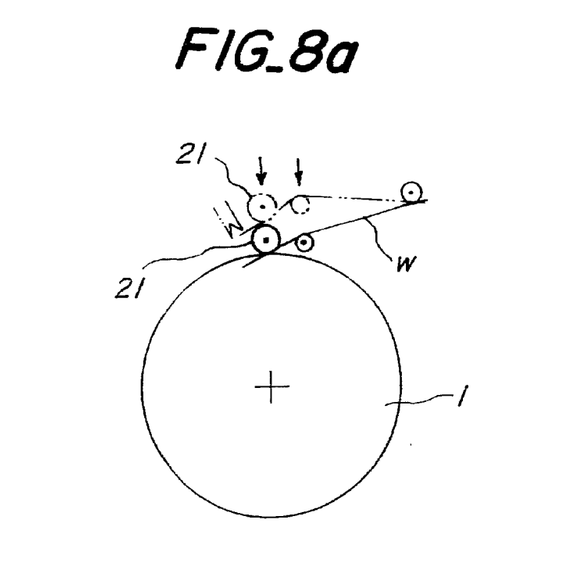
FIGS. 8a, 8b, 8c, and 8d are explanatory diagrams showing an operation of a device.

Next, the wire supply device 18 is displaced to a predetermined position with respect to the bead wire winding space, that is, an operating position, and moves the grooved roll 21 down as shown in FIG. 8a. The tip portion of the bead wire W is inserted between the clamping claw 13 in an open state and the rear surface of the protrusion 10 in a formed portion of the notch 12 shown in FIGS. 4a and 4b. Subsequently, the clamping claw 13 is placed in the closed state shown in FIG. 4c, and the bead wire W is pinched between the rear surface of the protrusion 10 and the clamping claw 13 at a predetermined force.

Figure 8B:
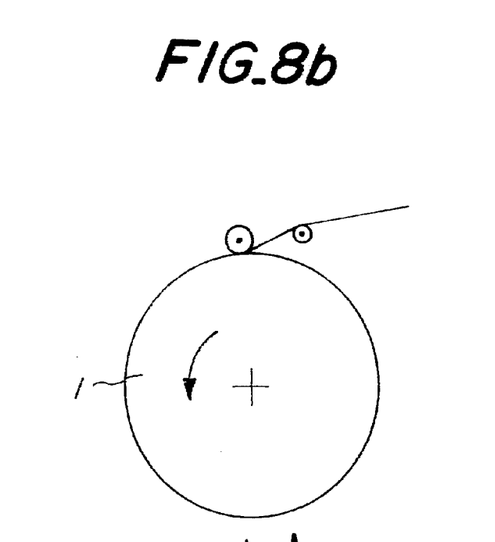
Figure 8C:
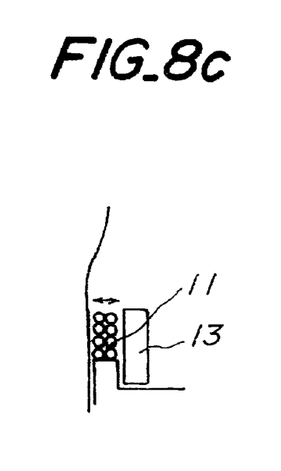

After that, the core body 1 and the winding guide 3 are rotated and driven as shown in FIG. 8b, and the bead wire W is made to rest against the core body side surface, or, more accurately, against the side surface of the tire during molding, on the wire seating portion 11, and and is wound a predetermined number of levels. In this case, when the specified number of winding rows of the winding bead wires is one, the grooved roll 21 is gradually retreatingly displaced, that is, displaced in the upward direction in the figure, and the winding radius sequentially increases. Additionally, when there are two rows of winding wires or more, as shown in a partial cross-sectional view in a radial direction of the core body 1 in FIG. 8c, based upon displacement of the wire supply device 18 in the axial line direction of the rotational shaft 2, winding is performed by, in addition to operating as described above, displacing the grooved roll 21 in the axial line direction for every winding of the bead wire W.

Figure 8D:
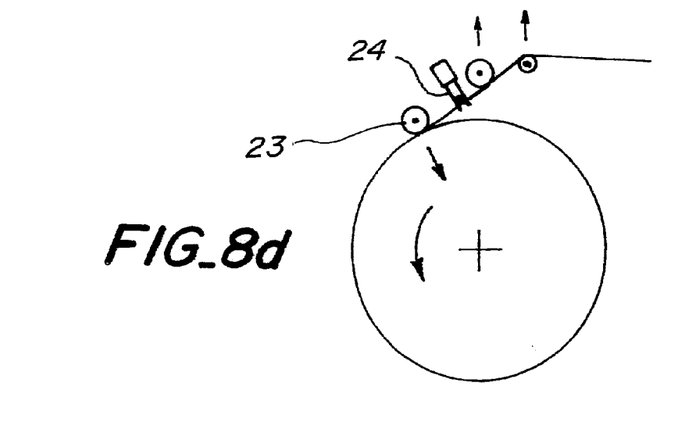

After specified winding of the bead wire W is completed by the above-mentioned procedure, the rotation of the core body 1 and the winding guide 3, pressing of the winding wire by the pressure roll 23, and raising of the grooved roll 21 shown in FIG. 8d are sequentially stopped. Additionally, the bead wire W is cut off by operating the cutter 24. Additionally, under the operation of the pressure roll 23, based upon the subsequent rotation of the core body 1 for approximately 1–3 rotations, the trailing end portion of the bead wire W is sufficiently crimped to the already-wound portion.

Furthermore, the wire supply device 18 is returned to the original retreated position, and the winding guide 3 is separatingly displaced from the core body 1 during the opening of the clamping claw 13, in the reduced-diameter state. The bead wire W remains as-is at the side portion of the core body 1, and the tire molding operation or the like can be sufficiently smoothly performed.

Furthermore, during a molding operation of one tire, needless to say, it is possible to repeatedly perform winding of the bead wire W plural times as described above.

Thus, in a tire formation process, since a bead wire(s) is wound at a predetermined position(s) as needed, the bead wire can be constantly accurately disposed without causing unexpected plastic deformation or the like, increasing equipment cost, and/or increasing the number of operation processes, and the required space and the like can be significantly decreased compared to the prior art.

Figure 9:
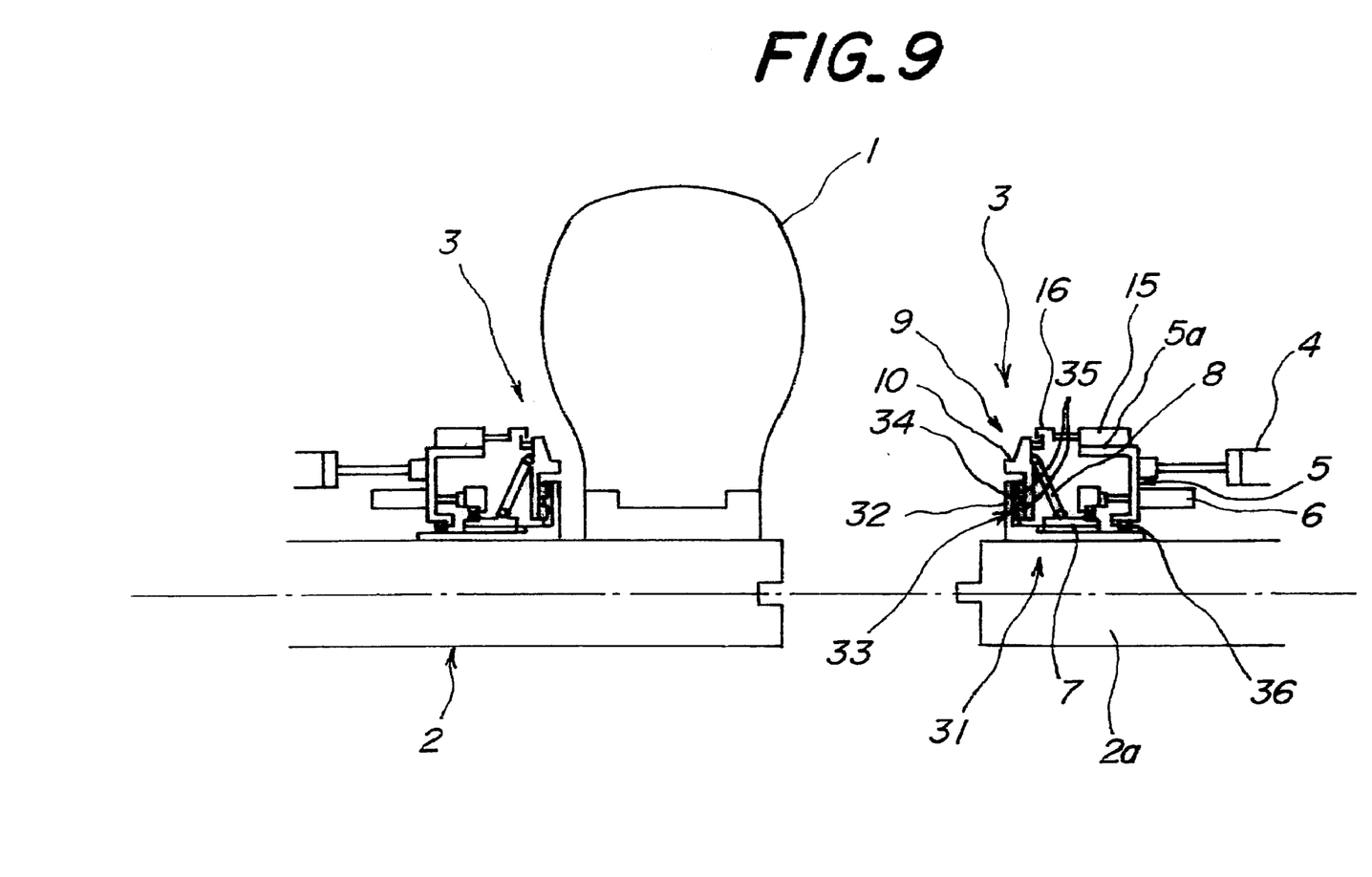
FIG. 9 is a cross-sectional view showing an upper half portion of an enlarging/reducing deformation guide mechanism for a radially displacing member.

FIG. 9 is a schematic cross-sectional view showing an upper half portion, above the center line, of a suitable structural example for enlargingly/reducingly displacing the radially displacing members, for example, fan-shaped members, of the winding guide 3.

Here, a base tube 31 is inserted between the rotational shaft 2 and the boss portion 7 of the winding guide 3. By engaging this base tube 31 with the rotational shaft 2 and the boss portion 7 with a key, a spline, a serration, or the like, the rotation of the base tube 31 and the boss portion 7, which is integral with the rotational shaft 2, is maintained, and the base tube 31 and the boss portion 7 can be independently displaced in the axial line direction of the rotational shaft 2.

Furthermore, at the end portion of the molding support body side of the base tube 31, a flange 32 is disposed that protrudes in a direction perpendicular to the axial line of the rotational shaft 2. A guide means 33 which guides displacement of the fan-shaped members 9 in a radial direction is disposed on this flange 32 and the fan-shaped members 9 that are connected to the boss portion 7 by the link members 8.

The guide means 33 can be structured by, for example, a rail 34 which is provided extending in a radial direction of the flange 32, and a moving guide formed of a slider 35 which is constantly engaged with the rail 34, and which is disposed directly or indirectly on the fan-shaped members 9. According to the guide means 33 with this type of structure, the position of the fan-shaped members 9 can be restricted to be within a plane perpendicular to the rotational axis.

Therefore, with this guide means 33, by pushing the boss portion 7 on the base tube 31 toward the molding support body through the enlarging/reducing cylinders 6, under the operation of the link members 8, the fan-shaped members 9 can be smoothly displaced in a radially outward direction without causing any positional changes with respect to the rotational axis. Meanwhile, by moving the boss portion 7 in a direction of separation from the molding support body 1, the fan-shaped members 9 can be smoothly displaced in a radially inward direction as the position with respect to the rotational axis is maintained as-is.

Additionally, the housing 5 of the winding guide 3 is supported by the base tube 31 via a bearing 36, and the burden of the cylinders 4 is decreased compared to the previous case.

According to this type of structure, under the operation of the cylinders 4, the winding guide 3 and the housing 5 can be integrally displaced in an axial line direction of the rotational shaft 2 in a state in which the winding guide 3 and the housing 5 ride together on the base tube 31, and the base tube 31 and the winding guide 3 can follow as the rotational shaft 2 is rotated. Therefore, needless to say, the same operational effects can be obtained as in the previous case. In particular, by independently disposing the guide means that guide displacement of the fan-shaped members 9 from the rotational shaft 2 in a radial direction, it is possible to simply and easily attach and remove a device structural member(s) to/from the rotational shaft 2.

INDUSTRIAL APPLICABILITY

As clarified from the above-mentioned description, according to this invention, in a tire molding process, by directly disposing a bead wire a predetermined position, pre-fabricating and storage of various kinds of bead rings and the like are not needed. In addition to eliminating the number of operation processes and required space, a bead setter to set a tire at a predetermined position during molding of the bead ring is not needed, and, without increasing equipment cost and the number of operations to operate the bead setter, unexpected deformation of the bead wire can be sufficiently eliminated, and accurate and efficient arrangement of the bead wire at a desired position can be realized.

What is claimed is:

1. A bead wire winding device comprising:
   a molding support body connected to a rotational shaft, at least one winding guide which is rotated with the molding support body, and which approachingly and retreatingly displaces with respect to each side portion of the molding support body and enlarging and reducingly deforms, and a wire supply means which supplies a bead wire to a wire seating portion of the winding guide within a space defined by each winding guide which is in an approached state with respect to a respective side surface of the molding support body, and in an enlarged diameter state,
   wherein the winding guide comprises a plurality of radially displacing members, which can be displaced in a radial direction, connected to a boss portion rough link members, each of the radially displacing members having a protrusion provided which is located radially inward of an outer periphery of the respective radially displacing member and which forms a wire seating portion, and advance/retreat driving means of the boss portion being disposed that advancingly and retreatingly drives the boss portion with respect to the molding support body, a clamping claw provided on at least one of the radially displacing members, the clamping claw being constantly urged in a closing direction and pinching a tip portion of the beard wire, and a driving means being provided that causes opening displacement of the clamping claw.

2. The bead wire winding device as set forth in claim 1, wherein the radially displacing member is constituted by a fan-shaped member, a circular arc-shaped segment, or a rod member.

3. The bead wire winding device as set forth in claim 1, wherein the advance/retreat driving means and the driving means are fixed to respective non-rotational side members.

4. The bead wire winding device as set forth in claim 1, wherein the molding support body is detachable from the rotational shaft.

5. The bead wire winding device as set forth in claim 1, wherein the wire supply means comprises a reforming roll which bends and deforms a bead wire which has been fed out, a grooved roll which specifies a winding position of the bead wire after it goes through the reforming roll, and a pressing roll which presses a rear end portion of the winding of the bead wire after it goes through the grooved roll.

6. The bead wire winding device as set forth in claim 5, wherein a cutter is disposed between the pressing roll and the grooved roll.

7. The bead wire winding device as set forth in claim 1, wherein the wire supply means is displaceable in an axial direction of the rotational shaft.

8. The bead wire winding device as set forth in claim 7, wherein the displacement in the axial direction of the wire supply means is a displacement with a pitch equivalent to a thickness of the bead wire.

9. The bead wire winding device as set forth in claim 1, wherein a base tube that rotates with the rotational axis and a boss portion of the winding guide are sequentially arranged on the rotational axis, the base tube and the boss portion being independently displaceable in an axial direction of the rotational axis, and a guide means which guides displacement of the radially displacing members in a radial direction is provided on each radially displacing member of the winding guide, and on a flange disposed at the end portion of a molding support body side of the base tube.

10. A method of winding a bead wire, comprising:
   winding the bead wire a predetermined number of levels on a wire seating portion of a winding guide, the winding guide defined by radially displacing members, each having a protrusion which is located radially inward of an outer periphery of the respective radially displacing member and which forms the wire seating portion which protrudes toward a molding support body, the bead wire being wound within a wire winding space defined by the molding support body and the winding guide, said winding guide adapted to approach a respective side surface of the molding support body while enlarging the diameter of the winding guide;

reducing the diameter of the winding guide and distancing the winding guide from the molding support body; and maintaining the feed wire which is made to rest against a side portion of the molding support body.

* * * * *